United States Patent
Edelman et al.

(10) Patent No.: US 8,189,294 B2
(45) Date of Patent: May 29, 2012

(54) APPARATUS INCLUDING MODIFIED WRITE POLE TIP

(75) Inventors: Harry Sam Edelman, Minneapolis, MN (US); David Christopher Seets, Shorewood, MN (US); Mourad Benakli, Bloomington, MN (US); Kirill Aleksandrovich Rivkin, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 72 days.

(21) Appl. No.: 12/819,998

(22) Filed: Jun. 21, 2010

(65) Prior Publication Data

US 2011/0310511 A1    Dec. 22, 2011

(51) Int. Cl.
G11B 5/23    (2006.01)

(52) U.S. Cl. ..................................... 360/125.3

(58) Field of Classification Search ............... 360/125.3
See application file for complete search history.

(56) References Cited

U.S. PATENT DOCUMENTS

| | | | |
|---|---|---|---|
| 6,950,277 B1 * | 9/2005 | Nguy et al. | 360/125.14 |
| 6,967,810 B2 | 11/2005 | Kasiraj et al. | |
| 7,576,951 B2 * | 8/2009 | Allen et al. | 360/125.13 |
| 7,848,054 B2 * | 12/2010 | Hsiao et al. | 360/125.09 |
| 2007/0258167 A1 * | 11/2007 | Allen et al. | 360/126 |
| 2008/0273276 A1 * | 11/2008 | Guan | 360/319 |
| 2009/0002896 A1 | 1/2009 | Mallary et al. | |

* cited by examiner

*Primary Examiner* — Mark Blouin
(74) *Attorney, Agent, or Firm* — Mueting Raasch & Gebhardt PA (57) ABSTRACT

An apparatus that includes a write element including a write element tip having a leading edge, a trailing edge, and first and second side edges connecting the leading edge to the trailing edge, wherein the trailing edge is non-planar; a trailing shield proximate the trailing edge of the write element; a first side shield proximate the first side edge; and a second edge proximate the second side edge.

17 Claims, 6 Drawing Sheets

APPARATUS INCLUDING MODIFIED WRITE POLE TIP

BACKGROUND

Shingled writing has been proposed as a means to extend the tracks per inch (also referred to as TPI) of magnetic storage. Generally, shingled writing involves sequentially writing partially overlapping tracks with a wide writer. The wide writer can provide higher fields and the sequential shingled writing cuts down the written width and limits adjacent tracks to a single write on one side of the track.

Shingled writing raises numerous concerns. First, writers can suffer from weak fields and gradients near the edge of the track. Second, shingled readback can suffer from transition skew with respect to the reader near the edge of the track. Third, asymmetric writers (which could compensate in part for weak edge field as discussed above) would function for only one skew polarity and would therefore double the maximum skew, and two asymmetric writers would be prohibitively expensive.

BRIEF SUMMARY

An apparatus that includes a write element including a write element tip having a leading edge, a trailing edge, and first and second side edges connecting the leading edge to the trailing edge, wherein the trailing edge is non-planar; a trailing shield proximate the trailing edge of the write element; a first side shield proximate the first side edge; and a second edge proximate the second side edge.

A method of writing data to a magnetic disk, the method including writing a first track of data along a first path with a magnetic writer, the magnetic writer including a write element including a write element tip having a leading edge, a trailing edge, and first and second side edges connecting the leading edge to the trailing edge, wherein the trailing edge is non-planar; a trailing shield proximate the trailing edge of the write element; a first side shield proximate the first side edge; and a second edge proximate the second side edge, wherein the first track of data has an initial width; and writing a second track of data along a second path with the magnetic writer, the second track of data having the initial width, wherein the second path substantially follows a direction of the first path and a portion of the second track of data overlaps a portion of the first track of data to produce a reduced first track of data having a reduced width that is narrower than the initial width.

An apparatus that includes a write element including a write element tip having a leading edge, a trailing edge, and first and second side edges connecting the leading edge to the trailing edge, the write element including a first portion of a first material and a second portion of a second material, wherein the first material and second material have magnetically different properties, and wherein the second portion forms at least part of the trailing edge and the first portion forms all of the leading edge, the first side edge, and the second side edge.

BRIEF DESCRIPTION OF THE DRAWINGS

FIGS. 7A and 7B are cross sectional views of write pole tips having non-planar trailing edges and substantially congruous trailing shields and side shields that are absent at the leading edge of the write pole tips according to an embodiment.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Disclosed herein are apparatuses that can also be referred to as magnetic writers. The apparatuses can generally include a write element and one or more shields. The writers disclosed herein can be used for shingled writing and can be bidirectional writers.

Figure 1:
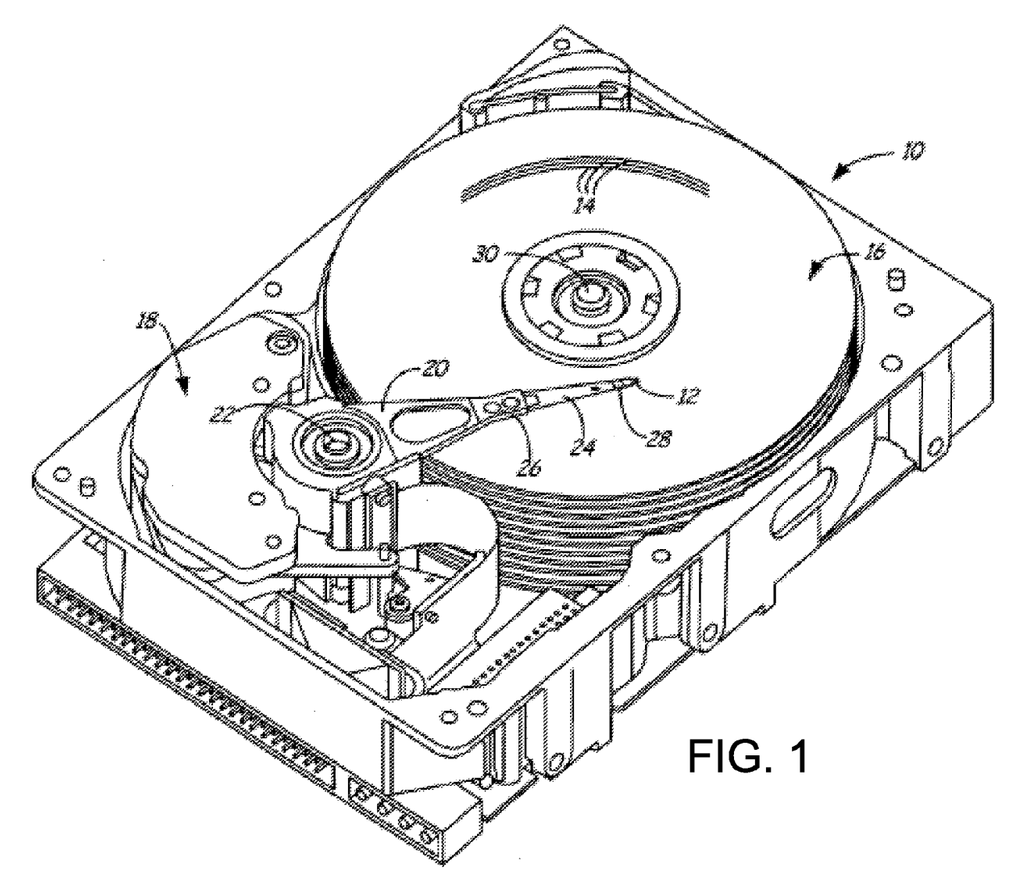
FIG. 1 is a perspective view of a magnetic recording system according to an embodiment.

FIG. 1 is a perspective view of a disc drive 10 including an actuation system for positioning slider 12 over track 14 of magnetic medium 16. The particular configuration of disc drive 10 is shown for ease of description and is not intended to limit the scope of the disclosure in any way. Disc drive 10 includes a voice coil motor (VCM) 18 arranged to rotate an actuator arm 20 on a spindle around an axis 22. A load beam 24 is connected to actuator arm 20 at a head mounting block 26. A suspension 28 is connected to an end of load beam 24 and slider 12 is attached to suspension 28. VCM 18 is regulated by a controller (not shown in this view). Magnetic medium 16 rotates around an axis 30, so that windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in this view) for reading and/or writing data on tracks 14 of magnetic medium 16. The magnetic transducer is described in more detail by way of example in the following figures.

Figure 2:
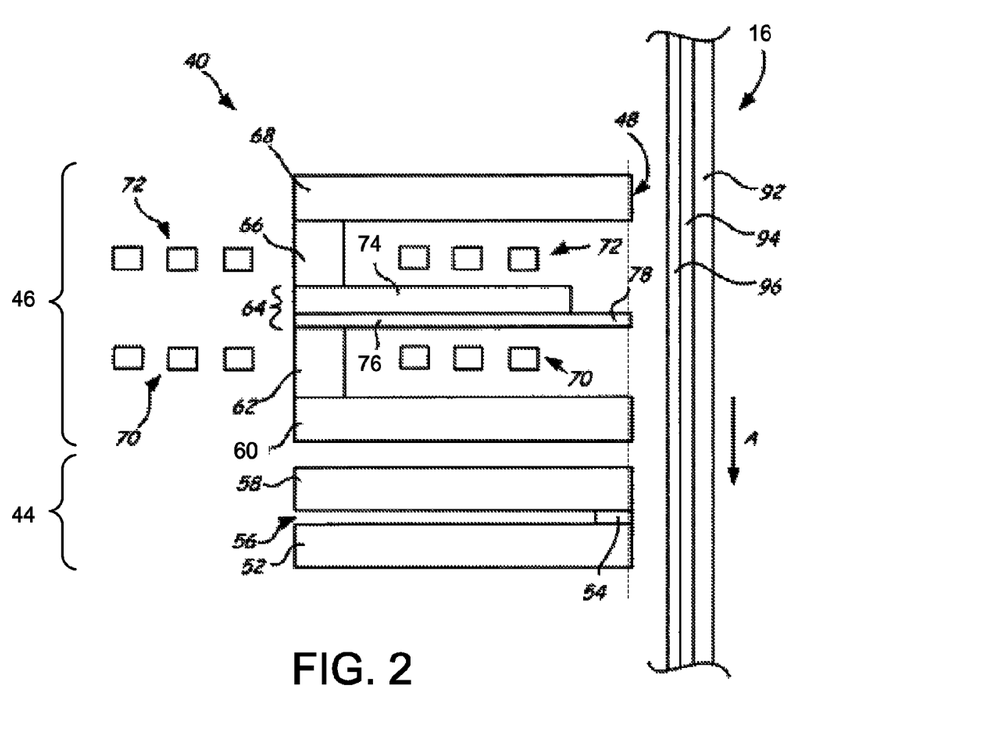
FIG. 2 is a cross-sectional view of a transducing head including a write element for writing to media according to an embodiment.

FIG. 2 is a cross-sectional view of transducing head 40 formed on slider 12 and including reader 44 and writer 46 that define medium confronting surface 48 (as shown by the dashed line). Reader 44 includes bottom shield structure 52, read element 54, read gap 56, and top shield structure 58. Writer 46 includes first return pole or element 60, first magnetic stud 62, write pole or element 64, second magnetic stud 66, second return pole or element 68, first conductive coil 70, and second conductive coil 72. Write pole or element 64 includes write pole or element body 76, yoke 74, and write pole or element tip 78.

Reader 44 and writer 46 are each multi-layered devices, and writer 46 is stacked on reader 44 in a piggyback configuration in which layers are not shared between the two elements. In other embodiments not illustrated, reader 44 and writer 46 may be arranged in a merged-head configuration (in which layers are shared between the two elements) and/or reader 44 may be formed on writer 46.

Read gap 56 is defined on medium confronting surface 48 between terminating ends of bottom shield 52 and top shield 58. Read element 54 is positioned in read gap 56 adjacent to medium confronting surface 48. Read gap 56 insulates read element 54 from bottom shield 52 and top shield 58. Read element 54 may be any variety of different types of read elements, such as a tunneling magnetoresistive (TMR) read element or a giant magnetoresistive (GMR) read element. In operation, magnetic flux from a surface of magnetic medium 16 causes rotation of a magnetization vector of read element 54, which in turn causes a change in electrical resistivity of read element 54. The change in resistivity of read element 54 can be detected by passing a current through read element 54 and measuring a voltage across read element 54. Shields 52 and 58, which may be made of a soft ferromagnetic material, guide stray magnetic flux from medium layer 96 away from read element 54 outside the area of medium layer 96 directly below read element 54.

In writer 46, first return pole 60, second return pole 68, first magnetic stud 62, and second magnetic stud 66 may comprise soft magnetic materials, such as NiFe. Conductive coils 70 and 72 may comprise a material with low electrical resistance, such as Cu. Write pole body 76 may comprise a high moment soft magnetic material, such as CoFe. Yoke 74 may comprise a soft magnetic material, such as NiFe or CoNiFe, to optimize the efficiency of flux delivery to write pole body 76. First conductive coil 70 surrounds first magnetic stud 62, which magnetically couples write pole 64 to first return pole 60. Second conductive coil 72 surrounds second magnetic stud 66, which magnetically couples write pole 64 to second return pole 68. First conductive coil 70 passes through the gap between first return pole 60 and write pole 64, and second conductive coil 72 passes through the gap between write pole 64 and second return pole 68.

Reader 44 and writer 46 are carried over the surface of magnetic medium 16, which is moved relative to transducing head 40 as indicated by arrow A such that write pole 64 leads first return pole 60, trails second return pole 68, and is used to physically write data to magnetic medium 16. In order to write data to magnetic medium 16, current is caused to flow through second conductive coil 72. The magnetomotive force in the coils causes magnetic flux to travel from write pole tip 78 perpendicularly through medium layer 96, across SUL 94, and through second return pole 68 and first magnetic stud 66 to provide a closed magnetic flux path. The direction of the write field at the medium confronting surface of write pole tip 78, which is related to the state of the data written to magnetic medium 16, is controllable based on the direction that the current flows through second conductive coil 72.

Stray magnetic fields from outside sources, such as a voice coil motor associated with actuation of transducing head 40 relative to magnetic medium 16, may enter SUL 94. Due to the closed magnetic path between write pole 64 and second return pole 68, these stray fields may be drawn into writer 46 by second return pole 68. In order to reduce or eliminate these stray fields, first return pole 60 is connected to write pole 64 via first magnetic stud 62 to provide a flux path for the stray magnetic fields. In addition, the strength of the write field through write pole 64 (due to current flowing through second conductive coil 72) may be augmented by causing current to flow through first conductive coil 70. The magnetomotive force in the coils causes magnetic flux to travel from write pole tip 78 perpendicularly through medium layer 96, across SUL 94, and through first return pole 60 and first magnetic stud 62 to provide a closed magnetic flux path. The direction of the current through first conductive coil 70 is opposite that of the current through conductive coil 72 to generate magnetic flux in the same direction through write pole 64. The effect of employing two return poles and two conductive coils may be an efficient driving force to write pole 64, with a reduction on the net driving force on first return pole 60 and second return pole 68.

Writer 46 is shown merely for purposes of illustrating a construction suitable for use with the assemblies described in the following figures, and variations on the design may be made. For example, while write pole 64 includes write pole body 76 and yoke 74, write pole 64 can also be comprised of a single layer of magnetic material. In addition, a single trailing return pole may be provided instead of the shown dual return pole writer configuration.

Figure 3A:
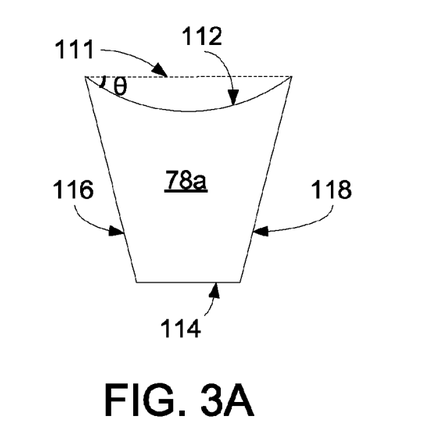
FIGS. 3A and 3B are cross sectional views of write pole tips having non-planar trailing edges according to an embodiment.

FIG. 3A shows a plan view of a write pole tip 78a from the direction of the magnetic media 16 (seen in FIG. 2) or the medium confronting surface of the write element or writer 46. As seen there, the write pole tip 78*a* has a trailing edge 112, a leading edge 114, a first side edge 116 and a second side edge 118. The trailing edge 112 is the edge of the write pole tip 78*a* that is closest to the first return pole 60 in FIG. 2. The leading edge 114 is the edge of the write pole tip 78*a* that is closest to the write pole body 74 in FIG. 2. Generally, the trailing edge 112 and the leading edge 114 are opposite each other. The first and second side edges 114 and 116 connect the trailing edge 112 to the leading edge 114 and are opposite each other.

Generally, the trailing edge 112 is non-planar. The phrase "non-planar" as utilized herein refers to a surface that is not flat. The dashed line 111 in FIG. 3A demonstrates a planar trailing edge. The trailing edge 112 in FIG. 3A is an example of a trailing edge that is curved. The trailing edge 112 in FIG. 3A is curved towards the leading edge 114. The angle θ defines the angle between a demonstrative planar trailing edge 111 and the non-planar trailing edge 112. This example of a trailing edge 112 can also be characterized as being concave. A concave trailing edge can function to divert magnetic flux towards the edge of a written track by increasing the gap length at the center of the track. A concave shaped trailing edge can divert flux to the track edges and can therefore function to correct track edge transition skew on both sides of the write pole (thereby allowing bidirectional writing).

Figure 3B:
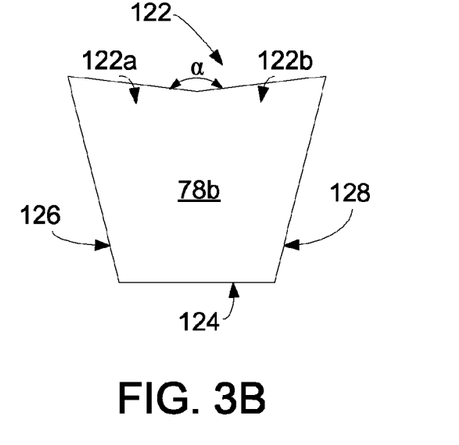

FIG. 3B depicts another example of a write pole tip 78*b* non-planar trailing edge. The trailing edge 122 in FIG. 3B is non-planar and more specifically is bi-planar in that it has two portions 122*a* and 122*b* that are each independently planar.

In embodiments where the two independently planar portions 122*a* and 122*b* are symmetrical across the trailing edge, the trailing edge can also be described as "v-shaped". A v-shaped trailing edge can be further described by the angle made by the two independently planar portions. The trailing edge 122 in FIG. 3B can be characterized by the angle α. In embodiments, α can be any angle from about 1° to about 20°; in embodiments from about 5° to about 15°; and in embodiments from about 8° to about 12°. In embodiments, the angle α can be about 10°.

A v-shaped trailing edge can divert flux to the track edges and can therefore function to correct track edge transition skew on both sides of the write pole (thereby allowing bidirectional writing). The angle α could be chosen to reduce curvature or integrated downtrack deviation. An embodiment having a v-shaped trailing edge that had an angle α of about 10° was shown to reduce integrated downtrack deviation of the trailing 1T field contour 20 nm below the air bearing surface (ABS).

Figure 4A:
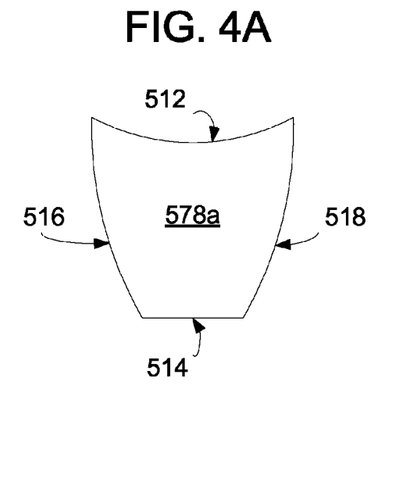
FIGS. 4A and 4B are cross sectional views of write pole tips having non-planar trailing edges and non-planar first and second side edges according to an embodiment.

FIG. 4A depicts a write pole tip 578*a* that includes at least one non-planar side edge. The write pole tip 578*a* includes a non-planar first side edge 516 and a non-planar second side edge 518. In embodiments, the first side edge and the second side edge can be symmetrical. The non-planar first and second side edges 516 and 518 can be described as convex or curved outward from the write pole tip 578*a*.

Figure 4B:
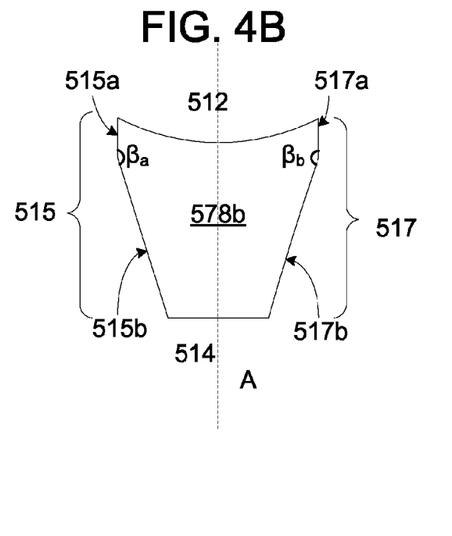

FIG. 4B depicts another write pole tip 578*b* that includes at least one non-planar side edge. The write pole tip 578*b* includes a non-planar first side edge 515 and a non-planar second side edge 517. The first side edge 515 is non-planar and is more specifically bi-planar in that it has two portions, the trailing edge side portion 515*a* and the leading edge side portion 515*b* that are each independently planar. The trailing edge side portion 515*a* can be characterized as being in a first plane; the leading edge side portion 515*b* can be characterized as being in a second plane; the trailing edge side portion 517*a* can be characterized as being in a third plane; and the leading edge side portion 517*b* can be characterized as being in a fourth plane. In embodiments, the first plane and the third plane can be substantially parallel or vertical with respect to a center axis (A) of the write pole tip. The trailing edge side portion 515*a* and the leading edge side portion 515*b* can be characterized by the angle between the two (shown as $\beta_a$ and $\beta_b$). $\beta_a$ and $\beta_b$ can be the same or different, in embodiments, $\beta_a$ and $\beta_b$ are substantially the same. In embodiments, $\beta_a$ and $\beta_b$ can be from about 145° to 180°; in embodiments from about 150° to about 175°; or in embodiments from about 155° to about 170°. In embodiments, the angles $\beta_a$ and $\beta_b$ can be from about 162° to about 166°; and in embodiments about 164°.

The write pole tips 578*a* and 578*b* can be characterized as being similar with the exception that the embodiment depicted in FIG. 4A has a gradual change from the trailing edge side portion to the leading edge side portion; and the embodiment depicted in FIG. 4B has an abrupt change from the trailing edge side portion to the leading edge side portion. In embodiments with an abrupt change (such as that depicted in FIG. 4B) generally, the trailing edge side portion 515*a* can be substantially vertical. In embodiments with an abrupt change (such as that depicted in FIG. 4B) the trailing side edge portion 515*a* can make up from about 5% to about 50% of the length of the first side edge 515 (or second side edge); in embodiments the trailing side edge portion can make up from about 10% to about 30% of the length of the first side edge; in embodiments the trailing side edge portion can make up from about 15% to about 25% of the length of the first side edge.

It is thought that vertical trailing side edge portions can enhance the track edge field and the transition quality. In situations where the writer is to be used for shingled writing, the effect of vertical trailing side edge portions on the middle diameter (MD) side encroachment at large skew angles is no longer relevant. Encroachment at zero skew can be tailored by tailoring the nature of the abrupt or gradual transition from the trailing edge side portion to the leading edge side portion.

Figure 5A:
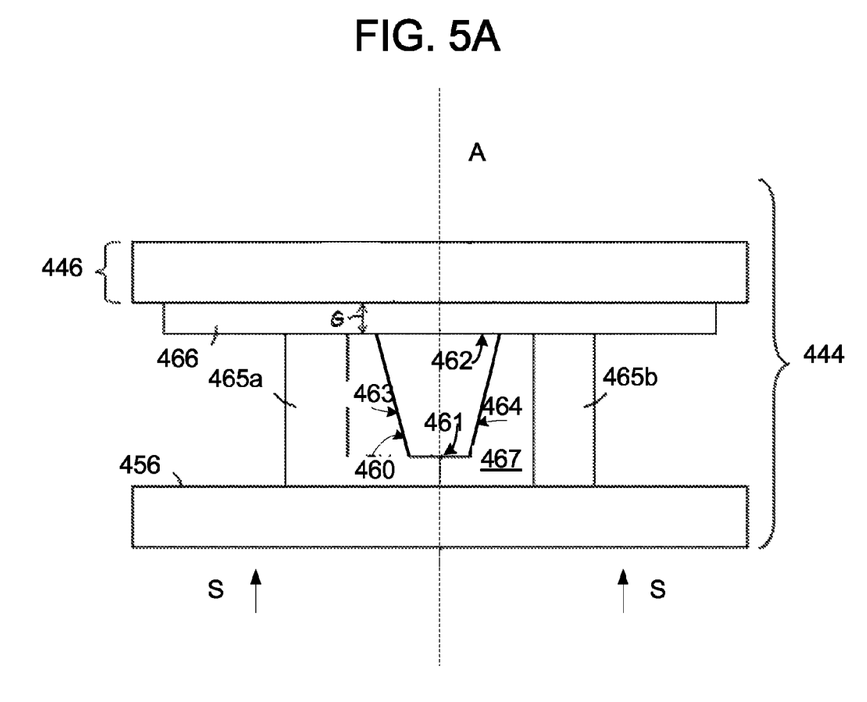
FIGS. 5A and 5B are external surface views of portions of magnetic transducers on the slider of FIG. 1 according to an embodiment.

FIG. 5A demonstrates another embodiment of an apparatus, or more specifically a portion of a writer 444. The writer 444 can include one or more shields. The writer 444 shown in FIG. 5A generally includes a trailing shield 446 spaced above trailing edge 462 of the main pole tip 460 by write gap material 466. The trailing shield 446 can be located proximate the trailing edge 462 of the write pole tip 460. The trailing shield 446 can also be referred to as a front shield. Write gap layer 466 spaces trailing edge 462 of the write pole tip 460 from the trailing shield 446 and is formed of a nonmagnetic spacer material to reduce flux couplings. Write gap layer 466 defines write gap G along tracking direction S, parallel to center axis A. Additional nonmagnetic material 467 can space main pole tip 460 from the first return pole 456 and from first side shield 465*a* and second side shield 465*b*. In embodiments, the first side shield 465*a* can be proximate the first side edge 463 of the write element tip 460 and the second side shield 465*b* can be proximate the second side edge 464 of the write element tip 460.

Figure 5B:
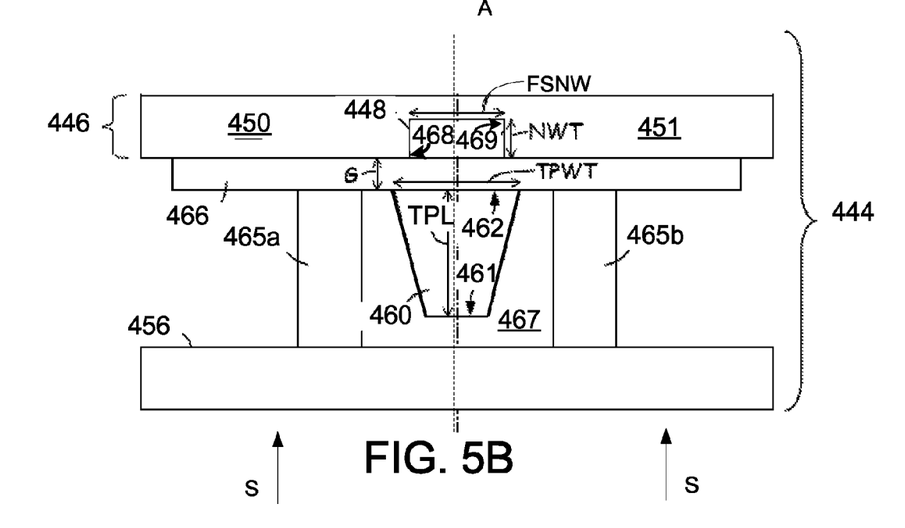

FIG. 5B displays another embodiment of a portion of a writer 444. The writer 444 has some components similar to those in FIG. 5A. The trailing shield 446 in this embodiment can be described as a multi-component trailing shield. The first (center) component 448 of the multi-component trailing shield 446 is spaced directly above the write pole tip 460 by write gap layer 466, along the center axis A. The transverse width of the first shield component 448 is the front shield notch width (FSNW), transverse to tracking direction S and perpendicular to center axis A. The axial length of the first shield component 448 (NWT) is defined along tracking direction S, parallel to center axis A.

Second (left and right) shield components 450, 451 of the multi-component trailing shield 446 are located adjacent first (center) shield component 448. First shield component 448 spaces second shield components 450, 451 in a transverse (crosstrack) direction from center axis A. Typically, first (center) and second (left and right) shield components 448, 450, and 451 are symmetrically arranged about center axis A, but in some embodiments, the arrangement can be asymmetric.

As shown in FIG. 5B, the second (left and right) shield components 450, 451 extend behind center shield component 448, opposite write gap material 466. In embodiments, each of second components 450 and 451 typically comprise the same material, forming a unitary second shield component, with first and second (left and right) sides connecting above center component 448. Alternatively, first component 448 divides second components 450 and 451 into separate left and right sections, resulting in a multi-piece trailing write shield structure with distinct left, center, and right pieces.

Second shield components 450, 451 may have different magnetic properties from first shield component 448. In some embodiments, for example, first component 448 can be formed of a nonmagnetic material and second component 450, 451 can be formed of magnetic materials, such that first component 448 forms a nonmagnetic notch or gap in the multi-component write shield 448. In some embodiments first (center) shield component 448 and write gap layer 466 are comprised of the same materials, but the notch or gap formed by first shield component 448 is nonetheless structurally and functionally distinct from write gap layer 466. In particular, write gap layer 466 spaces multi-component write pole shield 446 from trailing edge 462 of the write pole tip 460 in a trackwise direction, while first shield component 448 spaces second shield components 450, 451 (or portions thereof) from center axis A in a crosstrack direction.

It is thought that write gap layer 466 reduces magnetic flux connections to the write pole tip 460, while first shield component 448 shapes the field within the write gap layer 466 in order to reduce field curvature along trailing edge 462 of main pole tip 460. Field shaping is determined by the geometry and composition of the first shield component 448 and second shield components 450, 451 relative to other elements of the writer 444. In particular, the different magnetic properties of the first shield component 448 and the second shield component 450, 451 are selected to reduce field curvature and increase the attainable storage density, while retaining sufficient effective field strength and gradient to define a readable bit pattern.

Figure 5C:
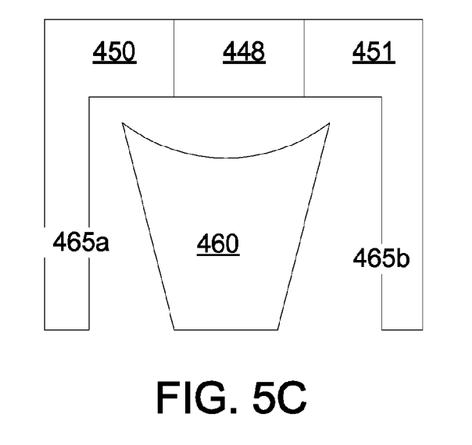
FIG. 5C is a cross sectional view of a write pole tip having a non-planar trailing edge and a multi-component trailing shield according to an embodiment.

FIG. 5C depicts another write pole tip 460 that can have a concave trailing edge combined with a multi-component trailing shield that contains a first component 448, and a second component 450, 451. As discussed above, the first component 448 can have different magnetic properties than the second component 450, 451 and in some embodiments, the first component 448 can be nonmagnetic and the second component 450, 451 can be magnetic. Such multi-component trailing shields can be combined with any of the write pole tips described herein (of which the concave trailing edge containing write pole tip 460 in FIG. 5C is one).

Figure 5D:
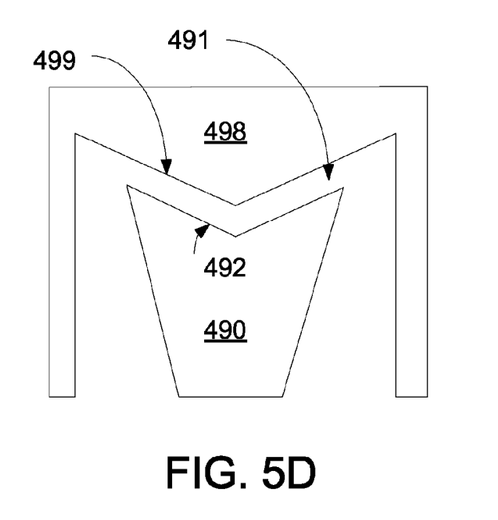
FIG. 5D is a cross sectional view of a write pole tip having a non-planar trailing edge and a substantially congruous trailing shield according to an embodiment.

Other embodiments can include trailing shields that may or may not be multi component shields but have an edge facing the write gap layer that is non-planar. An example of such an embodiment is depicted in FIG. 5D. The apparatus in FIG. 5D includes a write pole tip 490 that has a non-planar, specifically a bi-planar trailing edge 492 and planar side edges. The trailing shield 498 has a non-planar edge 499 facing the write gap 491. The non-planar edge 499 of the trailing shield 498 is specifically bi-planar. In an embodiment, the bi-planar edge 499 of the trailing shield 498 is congruous with the trailing edge 492 of the write pole tip 490. "Congruous" as used herein refers to at least two surfaces that follow similar lines; two substantially congruous surfaces exist substantially in the same plane or planes.

Also disclosed herein are apparatuses or magnetic writers that include first and second side shields that are non-planar. In embodiments where the first and second side edges of the write pole tip are non-planar, the first and second side shields can be at least partially congruous with the first and second side edges of the write pole tip.

Figure 6A:
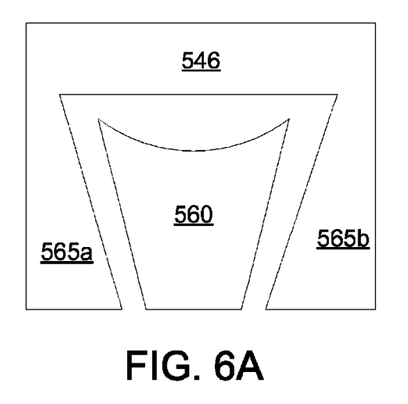
FIG. 6A is a cross sectional view of a write pole tip having a non-planar trailing edge and substantially congruous side shields according to an embodiment.
Figure 6B:
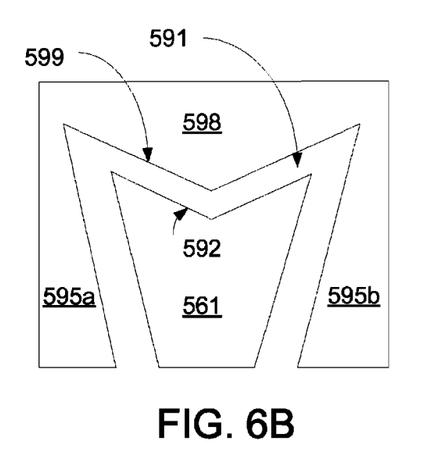
FIG. 6B is a cross sectional view of a write pole tip having a non-planar trailing edge and substantially congruous trailing and side shields according to an embodiment.
Figure 6C:
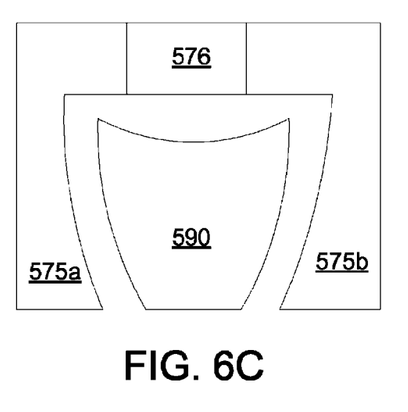
FIG. 6C is a cross sectional view of a write pole tip having a non-planar trailing edge and non-planar side edges and a multi-component trailing shield and substantially congruous side shields according to an embodiment.

FIG. 6A depicts an embodiment of a write pole tip 560 that has a concave trailing edge and planar first and second side edges. The trailing shield 546 in the depicted embodiment is a single component shield and the first and second side shields 565a and 565b are substantially congruous with the first and second side edges of the write pole tip 560. FIG. 6B depicts another embodiment that includes a substantially congruous trailing shield 598 associated with a write pole tip 561 and substantially congruous side shields 595a, 595b. FIG. 6C depicts another embodiment that includes substantially congruous side shields 575a, 575b associated with a write pole tip 590 and a multi-component trailing shield 576 (as discussed above with respect to FIG. 5B for example).

Apparatuses or writers disclosed herein can also include side shields that extend partially along the edges of the write pole. In embodiments, apparatuses or writers disclosed herein can include side shields that extend only partially along the edges of the write pole. In shingled writing, leading edge encroachment on adjacent tracks, which occurs primarily on the MD side at skew is not an issue, therefore, side shields may be omitted near the leading edge to minimize field loss.

Figure 7A:
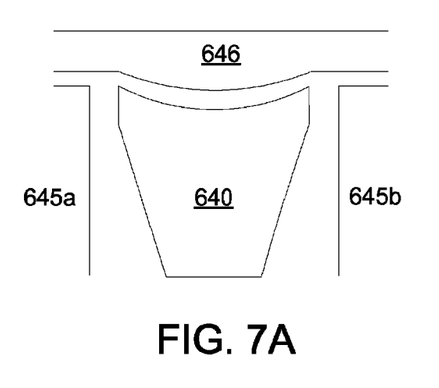
FIG. 7A is a cross sectional view of a write pole tip having a non-planar trailing edge and a substantially congruous trailing shield and side shields that trail away from the leading edge according to an embodiment.

FIG. 7A illustrates an example of an apparatus or writer where the first and second side shields are not located proximate the leading edge of the write pole tip. The writer in FIG. 7A includes a write pole tip 640 with non-planar trailing edge and non-planar first and second side edges. The trailing shield 646 in this embodiment is substantially congruous with the trailing edge of the write pole tip 640 and the side shields 645a and 645b trail away from the write pole tip 640 towards the leading edge of the write pole tip 640.

Figure 7B:
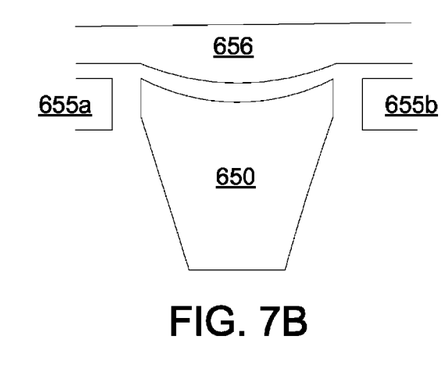

FIG. 7B illustrates another embodiment of an apparatus or writer where the side shields are removed towards the leading edge of the write pole tip. As seen in the exemplary writer of FIG. 7B, the write pole tip 650 has a non-planar trailing edge and non-planar (or more specifically bi-planar) first and second side edges. The trailing shield 656 in this embodiment is substantially congruous with the trailing edge of the write pole tip 650 and the side shields 655a and 655b are absent towards the leading edge of the write probe tip 650. The first and second side shields 655a and 655b in this embodiment are located along the trailing edge side portions of the first and second side edges of the write pole tip. In embodiments, the first and second side shields 655a and 655b can be located only along the trailing edge side portions of the first and second side edges of the write pole tip.

Figure 7C:
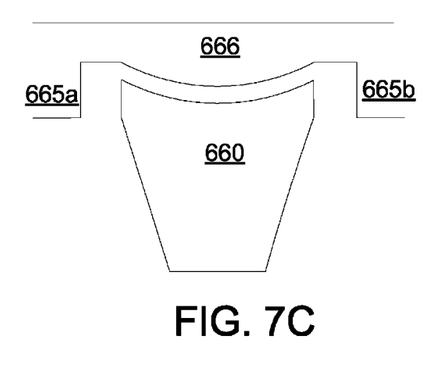

FIG. 7C illustrates another embodiment of an apparatus or writer where the side shields are removed towards the leading edge of the write pole tip. As seen in the writer of FIG. 7C, the write pole tip 660 has a non-planar trailing edge and non-planar (or more specifically bi-planar) first and second side edges. The trailing shield 666 in this embodiment is substantially congruous with the trailing edge of the write pole tip 660 and the side shields 665a and 665b are absent towards the leading edge of the write probe tip 660. The first and second side shields 665*a* and 665*b* in this embodiment are only located along the trailing edge side portions of the first and second side edges of the write pole tip. As seen in this embodiment, the write gap that can extend into the side shields in some embodiments is absent in this embodiment, in effect causing the trailing shield 666 and the first and second side shields 665*a*, 665*b* to be a solid piece of shield material (for example a magnetic material).

Figure 8:
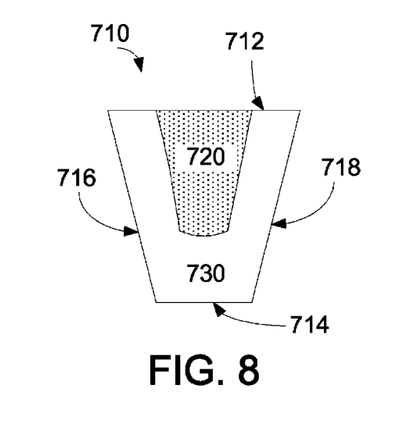
FIG. 8 is a cross sectional view of a write pole tip that includes a first and second portion made of materials having different magnetic properties according to an embodiment.

FIG. 8 illustrates a cross section of another embodiment of an apparatus or writer disclosed herein. The apparatus includes a write pole tip 710 that has the trailing edge 712, leading edge 714, and first 716 and second 718 side edges as discussed above. The write pole tip 710 includes a second portion 720 and a first portion 730. The second portion 720 forms at least a portion of the trailing edge 712. The first portion 730 forms all of the leading edge 714, the first side edge 716, and the second side edge 718. The second portion 720 can also be characterized as being encapsulated by the first portion 730.

The second portion 720 is generally made of a second material and the first portion 730 is generally made of a first material. The first and second materials have magnetically different properties. The first and second materials may have the same chemical composition, but have been processed to provide different magnetic materials or they can be different chemical compositions. The second material can generally have a magnetic moment that is lower than the magnetic moment of the first material. Materials for the first material may include, for example, CoFe. Materials for the second material may include, for example, NiFe.

Apparatuses such as those depicted in FIG. 8 may function to divert magnetic flux towards the edge of a written track by increasing the gap length at the center of the track thereby correcting track edge transition skew on both sides of the write pole to allow bidirectional writing. Such apparatuses can be formed using Damascene pole processes. Additional layers, including seed layers can also be utilized in such write poles.

Embodiments of the writers may function to boost the magnetic field near the trailing corners by channeling flux away from the center of the track, this can reduce the writer width that can provide sufficient edge fields and can thereby boost the format efficiency. Embodiments of the writers may boost the magnetic field near the trailing corners by increasing the corner wall angle; the pole wall angle can increase away from the corner to reduce encroachment at low skew angles. Embodiments of the writers may confine the side shields to the trailing corners because shielding the leading portion of the write pole when it is skewed would not be needed. Embodiments of the writers can be symmetrical to enable them to write with equally high track density at either skew polarity.

Apparatuses or writers such as those described herein can be utilized to write data to a magnetic disk. In embodiments, such apparatuses or writers can be utilized for shingled writing processes. Such methods can include steps of writing a first track of data along a first path with a magnetic writer, wherein the first track of data has an initial width; and writing a second track of data along a second path with the magnetic writer, the second track of data having the initial width, wherein the second path substantially follows a direction of the first path and a portion of the second track of data overlaps a portion of the first track of data to produce a reduced first track of data having a reduced width that is narrower than the initial width. Such methods can also include steps of reading the data from the first track of data. The methods can also include writing and reading subsequent tracks of data where writing subsequent tracks of data substantially follow the direction of previous tracks of data and at least partially overlaps a portion of previously written data.

Thus, embodiments of APPARATUS INCLUDING MODIFIED WRITE POLE TIP are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   a write element including a write element tip having a leading edge, a trailing edge, and first and second side edges connecting the leading edge to the trailing edge, wherein the trailing edge, the first side edge, and the second side edge are non-planar and wherein at least portions of the first and second side edges are convex;
   a trailing shield proximate the trailing edge of the write element;
   a first side shield proximate the first side edge; and
   a second side shield proximate the second side.

2. An apparatus comprising:
   a write element including a write element tip having a leading edge, a trailing edge, and first and second side edges connecting the leading edge to the trailing edge, wherein the trailing edge, the first side edge, and the second side edge are non-planar and wherein the first and second side edges are each individually bi-planar;
   a trailing shield proximate the trailing edge of the write element;
   a first side shield proximate the first side edge; and
   a second side shield proximate the second side.

3. The apparatus according to claim 2, wherein the first side edge comprises a trailing edge side portion and a leading edge side portion, with the trailing edge side portion being in a first plane and the leading edge side portion being in a second plane; and the second side edge comprises a trailing edge side portion and a leading edge side portion, with the trailing edge side portion being in a third plane and the leading edge side portion being in a fourth plane.

4. The apparatus according to claim 3, wherein the trailing edge side portions of the first side edge and the second side edge are substantially parallel.

5. An apparatus comprising:
   a write element including a write element tip having a leading edge, a trailing edge, and first and second side edges connecting the leading edge to the trailing edge, wherein the trailing edge, the first side edge, and the second side edge are non-planar and wherein the first and second side edges are symmetrical;
   a trailing shield proximate the trailing edge of the write element;
   a first side shield proximate the first side edge; and
   a second side shield proximate the second side.

6. The apparatus according to claim 5, wherein the trailing edge is v-shaped.

7. An apparatus comprising:
   a write element including a write element tip having a leading edge, a trailing edge, and first and second side edges connecting the leading edge to the trailing edge, wherein the trailing edge is bi-planar;
   a trailing shield proximate the trailing edge of the write element;
   a first side shield proximate the first side edge; and
   a second side shield proximate the second side.

8. An apparatus comprising:
a write element including a write element tip having a leading edge, a trailing edge, and first and second side edges connecting the leading edge to the trailing edge, wherein the trailing edge is non-planar;
a trailing shield proximate the trailing edge of the write element wherein the trailing shield comprises:
a first component located above the main pole tip along a center axis of the magnetic writer; and
a second component having different magnetic properties from the first component, the second component extending perpendicularly to the center axis from opposing sides of the first component;
a first side shield proximate the first side edge; and
a second side shield proximate the second side edge.

9. The apparatus according to claim 8, wherein the first component is formed of nonmagnetic material and the second component is formed of magnetic material.

10. An apparatus comprising:
a write element including a write element tip having a leading edge, a trailing edge, and first and second side edges connecting the leading edge to the trailing edge, wherein the trailing edge, the first side edge, and the second side edge are non-planar;
a trailing shield proximate the trailing edge of the write element;
a first side shield proximate the first side edge; and
a second side shield proximate the second side,
wherein the first and second side shields are at least partially congruous with the first and second side edges respectively.

11. The apparatus according to claim 10, wherein the first and second side shields are not proximate the leading edge of the write element tip.

12. An apparatus comprising:
a write element including a write element tip having a leading edge, a trailing edge, and first and second side edges connecting the leading edge to the trailing edge, wherein the trailing edge is non-planar;
a trailing shield proximate the trailing edge of the write element;
a first side shield proximate the first side edge; and
a second side shield proximate the second side edge,
wherein the apparatus is a bidirectional writer.

13. A method of writing data to a magnetic disk, the method comprising:
writing a first track of data along a first path with a magnetic writer, the magnetic writer comprising:
a write element including a write element tip having a leading edge, a trailing edge, and first and second side edges connecting the leading edge to the trailing edge, wherein the trailing edge is non-planar;
a trailing shield proximate the trailing edge of the write element;
a first side shield proximate the first side edge; and
a second side shield proximate the second side edge,
wherein the first track of data has an initial width; and
writing a second track of data along a second path with the magnetic writer, the second track of data having the initial width, wherein the second path substantially follows a direction of the first path and a portion of the second track of data overlaps a portion of the first track of data to produce a reduced first track of data having a reduced width that is narrower than the initial width.

14. The method according to claim 13 further comprising reading data from the first track of data.

15. An apparatus comprising:
a write element including a write element tip having a leading edge, a trailing edge, and first and second side edges connecting the leading edge to the trailing edge, the write element comprising a first portion of a first material and a second portion of a second material, wherein the first material and second material have magnetically different properties, and wherein the second portion forms at least part of the trailing edge and the first portion forms all of the leading edge, the first side edge, and the second side edge.

16. The apparatus according to claim 15, wherein the second material has a magnetic moment that is lower than the magnetic moment of the first material.

17. The apparatus according to claim 15, wherein the first material is CoFe; and the second material is NiFe.

* * * * *